J. E. WRIGHT.
RAIL CROSSING.
APPLICATION FILED SEPT. 29, 1914.
1,138,713.
Patented May 11, 1915.
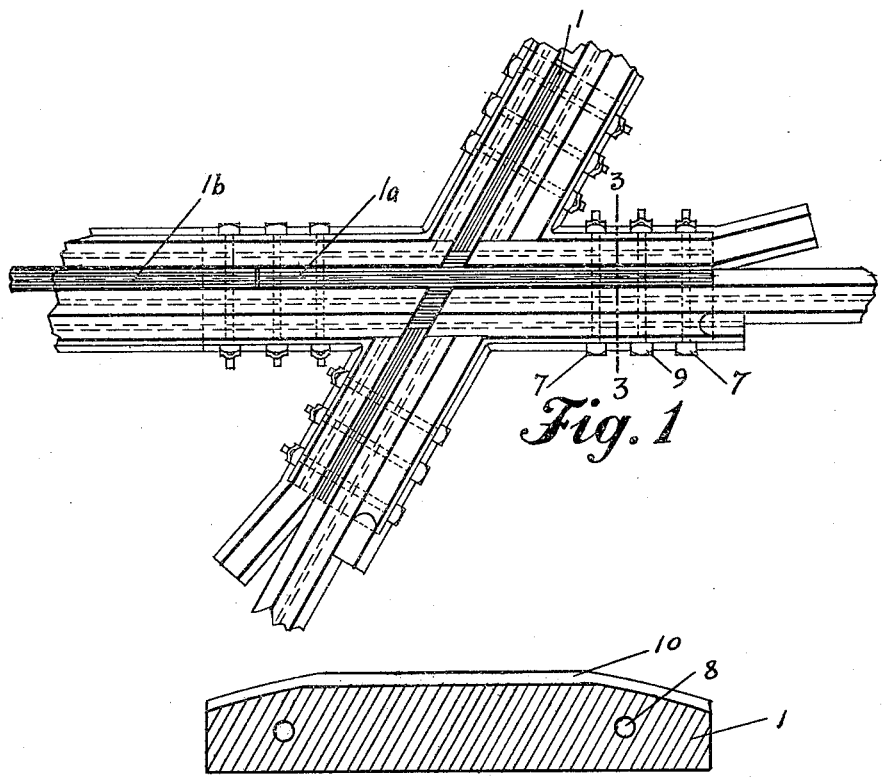
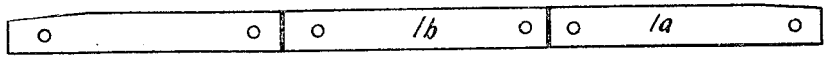
WITNESSES:
Nellie M. Angus
Joseph V. Carpenter
INVENTOR
James E. Wright
BY
Geo. B. Willcox ATTORNEY

UNITED STATES PATENT OFFICE.

JAMES E. WRIGHT, OF BAY CITY, MICHIGAN.

RAIL-CROSSING.

1,138,713. Specification of Letters Patent. Patented May 11, 1915.

Application filed September 29, 1914. Serial No. 864,108.

*To all whom it may concern:*

Be it known that I, JAMES E. WRIGHT, a citizen of the United States, residing at Bay City, in the county of Bay and State of Michigan, have invented certain new and useful Improvements in Rail-Crossings; and I do hereby declare the following to be a full, clear, and exact description of the invention, such as will enable others skilled in the art to which it appertains to make and use the same.

This invention is an improvement in railroad crossings and pertains more particularly to a railroad crossing construction, the object of which is to prevent the battering of the ends of rails by the repeated impacts of the wheels of trains passing over frogs or crossings in the track.

The improvement pertains more particularly to a removable filler of new construction that is adapted to be received between the railroad rail and the guard-rail of the track at a crossing, the function of the filler being to support the wheel by its flange instead of by its tread when the wheel passes the joint formed by an intersecting rail. The temporary transfer of the load from the wheel tread to the wheel flange and to the filler prevents the tread from battering the rail end and produces a quieter and smoother crossing.

With these and certain other objects in view which will appear later in the specification, my invention consists in the devices described and claimed and the equivalents thereof.

In the drawings, Figure 1 is a top plan view of two intersecting rails with my improvement attached. Fig. 2 is a longitudinal section through a filler made in one piece. Fig. 3 is an enlarged part transverse section on the line 3—3 of Fig. 1, showing the tread and flange of a wheel. Fig 4 is a diagrammatic side view of a number of filler members arranged end-to-end to form a single long filler.

As is clearly shown in the drawings, the device consists in a filler piece 1 of any suitable wear-resisting material such as cast or rolled steel, set in a channel formed in an inner fish-plate 2 secured between the web of the guard-rail 3 and the web of the track-rail 4, the inner fish-plate being held in place by means of the rail webs, and a pair of outer fish-plates 5 and 6 which are secured together by means of through-bolts 7 and 9. If desired the inner channeled fish-plate 2 may be made in two parts divided longitudinally, as shown in Fig. 3. In this case the tightening of bolts 7 and 9 also clamps the sides of the inner fish-plates to the sides of the filler pieces 1. The filler piece 1 is formed with openings 8 to receive the tie bolts 9, by which the filler piece is held against vertical movement. The upper or wearing surface of the filler piece 1 is concaved as at 10 to receive the flange 11 of the car wheel, and the filler piece is gradually tapered toward its ends, as indicated in an exaggerated manner in Fig. 2, whereby the wheels are made to gradually rise so that their treads 12 will slightly clear the tops of the rails when the wheel passes over the joint.

When the filler pieces become worn sufficiently to require renewing, they can be removed and new ones inserted by merely removing the bolts 9, loosening the bolts 7 and lifting out the filler pieces, after which new fillers can be inserted.

While I have shown and described a filler as made of a single piece and of relatively short length, it will be understood that it can be made of more than one piece and of any length, so that one filler may extend across both rails of a track crossing, if desired, or a long filler may be built up of several shorter filler sections, as $1^a$, $1^b$, placed end-to-end as indicated in Figs. 1 and 4, the parts being bolted to the track in the same manner as I have described above, so that one section of the filler may be removed and replaced at a time.

By the means above described, I have produced a crossing construction that prevents the wheels pounding down and splitting the ends of the rails, and in which the filler is capable of being easily and quickly renewed. A crossing constructed with these fillers is almost noiseless and very durable. It is also less dangerous than the ordinary crossing, as it reduces to a minimum the liability of cars jumping the track.

Having thus described my invention, what I claim and desire to secure by Letters Patent is:

1. A joint for track-rails comprising a guard-rail, a filler piece secured between said guard rail and the meeting ends of the track rails, said filler piece having a concaved upper surface and having its ends downwardly beveled, fish-plates adapted to receive said filler piece between them, and means for clamping said guard-rail, track rails, filler piece and fish-plates together, for the purposes set forth.

2. A joint for track-rails comprising a guard rail, a filler piece secured between said guard rail and the meeting ends of the track rail, said filler piece having a concaved upper surface and having its ends downwardly beveled, a fish-plate located between the track rails and guard rail and having its upper face formed with a longitudinal slot to receive said filler piece, and fastening means adapted to secure said guard-rail, track rails and fish-plate together.

3. A joint for track rails comprising a guard-rail, a sectional filler piece secured between said guard rail and the meeting ends of the track rail, said sectional filler piece having a concaved upper surface and having the ends of its extreme sections downwardly beveled, a fish-plate located between the track rails and guard-rail and having its upper face formed with a longitudinal slot to receive said filler piece, and fastening means adapted to secure said guard-rail, track rails and fish-plate together.

In testimony whereof, I affix my signature in presence of two witnesses.

JAMES E. WRIGHT.

Witnesses:
NELLIE M. ANGUS,
FRANK L. MARTINDALE.

Copies of this patent may be obtained for five cents each, by addressing the "Commissioner of Patents. Washington, D. C."